(12) United States Patent
Jeong et al.

(10) Patent No.: US 10,433,162 B2
(45) Date of Patent: Oct. 1, 2019

(54) SECURE RADIO ACCESS WITH INTER-ENB CARRIER AGGREGATION

(71) Applicant: NTT DOCOMO, INC., Tokyo (JP)

(72) Inventors: Moo Ryong Jeong, Palo Alto, CA (US); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 139 days.

(21) Appl. No.: 14/655,638

(22) PCT Filed: Jan. 6, 2014

(86) PCT No.: PCT/US2014/010273
§ 371 (c)(1),
(2) Date: Jun. 25, 2015

(87) PCT Pub. No.: WO2014/109968
PCT Pub. Date: Jul. 17, 2014

(65) Prior Publication Data
US 2015/0350896 A1 Dec. 3, 2015

Related U.S. Application Data

(60) Provisional application No. 61/750,732, filed on Jan. 9, 2013.

(51) Int. Cl.
*H04W 12/04* (2009.01)
*H04W 36/00* (2009.01)
(Continued)

(52) U.S. Cl.
CPC ....... *H04W 12/04* (2013.01); *H04W 36/0016* (2013.01); *H04W 36/06* (2013.01); *H04L 2463/061* (2013.01); *H04W 88/08* (2013.01)

(58) Field of Classification Search
CPC . H04W 12/04; H04W 36/0016; H04W 36/06; H04W 88/08
See application file for complete search history.

(56) References Cited

U.S. PATENT DOCUMENTS

2006/0120530 A1* 6/2006 Vialen .................. H04W 12/02
380/270
2007/0249352 A1* 10/2007 Song ...................... H04L 63/08
455/436
(Continued)

FOREIGN PATENT DOCUMENTS

| JP | 2010-045692 A | 2/2010 |
|----|---------------|--------|
| JP | 2011-024037 A | 2/2011 |
| WO | 2012/139016 A2 | 10/2012 |

OTHER PUBLICATIONS

International Search Report issued in PCT/US2014/010273, dated Apr. 17, 2014 (2 pages).
(Continued)

*Primary Examiner* — Abu S Sholeman
(74) *Attorney, Agent, or Firm* — Osha Liang LLP (57) ABSTRACT

A system for securing radio access with inter-eNB carrier aggregation including a primary eNB configured to secure transmission with a user equipment. The primary eNB generates a base key and derives a set of derived keys used to secure transmission on a set of radio bearers that correspond to the set of derived keys. The system for securing radio access with inter-eNB carrier aggregation also including a secondary eNB configured to secure transmission with the UE using at least one of the set of derived keys received which corresponds to a radio bearer from the set of radio bearers used by the SeNB.

3 Claims, 6 Drawing Sheets

(51) Int. Cl.
*H04W 36/06* (2009.01)
*H04W 88/08* (2009.01)

(56) References Cited

U.S. PATENT DOCUMENTS

| | | | | |
|---|---|---|---|---|
| 2008/0130580 A1* | 6/2008 | Chaponniere | H04W 36/02 | 370/331 |
| 2008/0167003 A1* | 7/2008 | Wang | H04W 8/20 | 455/411 |
| 2009/0092107 A1* | 4/2009 | Cai | H04W 24/10 | 370/338 |
| 2009/0209259 A1* | 8/2009 | Brusilovsky | H04W 12/04 | 455/438 |
| 2009/0220079 A1* | 9/2009 | Harada | H04W 12/02 | 380/252 |
| 2009/0220087 A1* | 9/2009 | Brusilovsky | H04L 63/062 | 380/272 |
| 2010/0056156 A1* | 3/2010 | Xu | H04W 12/04 | 455/436 |
| 2010/0111308 A1* | 5/2010 | Forsberg | H04L 63/061 | 380/278 |
| 2010/0267363 A1* | 10/2010 | Blom | H04J 11/0069 | 455/410 |
| 2010/0303041 A1* | 12/2010 | Diachina | H04W 36/14 | 370/331 |
| 2010/0329452 A1* | 12/2010 | Alanara | H04L 9/065 | 380/44 |
| 2011/0002304 A1* | 1/2011 | Lee | H04W 36/02 | 370/331 |
| 2011/0013593 A1* | 1/2011 | Hapsari | H04W 36/02 | 370/331 |
| 2011/0269426 A1* | 11/2011 | Hultin | H04W 12/10 | 455/411 |
| 2012/0026980 A1* | 2/2012 | Gao | H04W 36/0077 | 370/331 |
| 2012/0142361 A1* | 6/2012 | Zhao | H04W 36/28 | 455/446 |
| 2012/0163336 A1* | 6/2012 | Adjakple | H04W 12/04 | 370/331 |
| 2012/0250520 A1* | 10/2012 | Chen | H04L 5/001 | 370/241 |
| 2013/0003975 A1* | 1/2013 | Fukuda | H04L 9/0838 | 380/273 |
| 2013/0013926 A1* | 1/2013 | Hakola | H04W 12/04 | 713/171 |
| 2013/0039349 A1* | 2/2013 | Ebrahimi Tazeh Mahalleh | H04L 1/0013 | 370/336 |
| 2013/0070731 A1* | 3/2013 | Lim | H04W 36/00 | 370/331 |
| 2013/0155948 A1* | 6/2013 | Pinheiro | H04W 4/70 | 370/328 |
| 2013/0229931 A1* | 9/2013 | Kim | H04W 24/10 | 370/252 |
| 2013/0250862 A1* | 9/2013 | Ohta | H04L 47/10 | 370/328 |
| 2013/0260811 A1* | 10/2013 | Rayavarapu | H04W 76/028 | 455/509 |
| 2014/0056220 A1* | 2/2014 | Poitau | H04W 76/14 | 370/328 |
| 2014/0056243 A1* | 2/2014 | Pelletier | H04W 74/04 | 370/329 |
| 2014/0086177 A1* | 3/2014 | Adjakple | H04W 12/08 | 370/329 |
| 2014/0213218 A1* | 7/2014 | Iwamura | H04W 12/04 | 455/411 |
| 2014/0307872 A1* | 10/2014 | Heo | H04W 52/0251 | 380/270 |
| 2015/0043734 A1* | 2/2015 | Escott | H04W 12/04 | 380/270 |
| 2015/0063091 A1* | 3/2015 | Vesterinen | H04W 76/028 | 370/216 |
| 2015/0111577 A1* | 4/2015 | Bao | H04W 36/24 | 455/436 |
| 2015/0121490 A1* | 4/2015 | Liu | H04W 12/04 | 726/6 |
| 2015/0127733 A1* | 5/2015 | Ding | H04W 4/08 | 709/204 |
| 2015/0319652 A1* | 11/2015 | Liu | H04W 12/04 | 455/410 |
| 2015/0365894 A1* | 12/2015 | Bai | H04L 1/1854 | 370/311 |
| 2016/0029213 A1* | 1/2016 | Rajadurai | H04W 12/04 | 380/283 |
| 2016/0165499 A1* | 6/2016 | Xu | H04W 36/02 | 370/331 |
| 2016/0242080 A1* | 8/2016 | Vikberg | H04W 36/0027 | |
| 2016/0309379 A1* | 10/2016 | Pelletier | H04W 76/27 | |

OTHER PUBLICATIONS

Notification of Reasons for Refusal issued in corresponding Japanese Application No. 2015-551800, dated Aug. 22, 2017 (9 pages).

* cited by examiner

SECURE RADIO ACCESS WITH INTER-ENB CARRIER AGGREGATION

CROSS-REFERENCE TO RELATED APPLICATIONS

The present application claims priority from U.S. Provisional Patent Application No. 61/750,732, filed on Jan. 9, 2013. The contents of the priority application are hereby incorporated by reference in its entirety.

BACKGROUND OF INVENTION

Technical Field

One or more embodiments of the present disclosure relate to secure radio access with inter-eNB carrier aggregation in radio network systems such as that of 3GPP's Long Term Evolution (LTE). A design according to one or more embodiments uses a set of bearers of a user equipment (UE) that is transmitted over an eNB, while another set of bearers of the UE is transmitted over a different eNB. Specifically, the one or more embodiments of the present invention are used to improve the security of radio networks with inter-eNB aggregation.

Background Art

In LTE and LTE-Advanced networks the security framework depends on the assumption that a user equipment (UE) is served by a single eNB. More specifically, the security-related procedures and the architecture of the core network, eNB, and UE, all depend on the assumption that a UE is served by a single eNB.

According to existing frameworks, an existing eNB may exchange the $K_{eNB}$ of a UE with another eNB when the serving eNB of the UE changes. Put another way, when the inter-eNB handover occurs, the existing eNB may exchange the $K_{eNB}$ with a new eNB. In LTE and LTE-Advanced networks $K_{eNB}$ is a base key specific to a UE and eNB pair and is used to derive a set of keys for ciphering or integrity-protecting the communications between the UE and the eNB over the radio interface. The set of keys derived from the $K_{eNB}$ may include: $K_{RRCenc}$, $K_{RRCint}$, $K_{UPenc}$.

As discussed above, in LTE and LTE-Advanced networks a base key, $K_{eNB}$, specific to a UE-eNB pair is defined and is used to derive other keys. If there is a change of serving eNB for a UE, the base key for the new pair of eNB and the UE is created. This new key can be created by the previous serving eNB or by the mobile management entity (MME) in the core network. Next, a new set of derived keys are re-derived using the new base key. However, in any scenario, there may be only one base key and only one set of derived keys that are effective at the same time.

Figure 1:
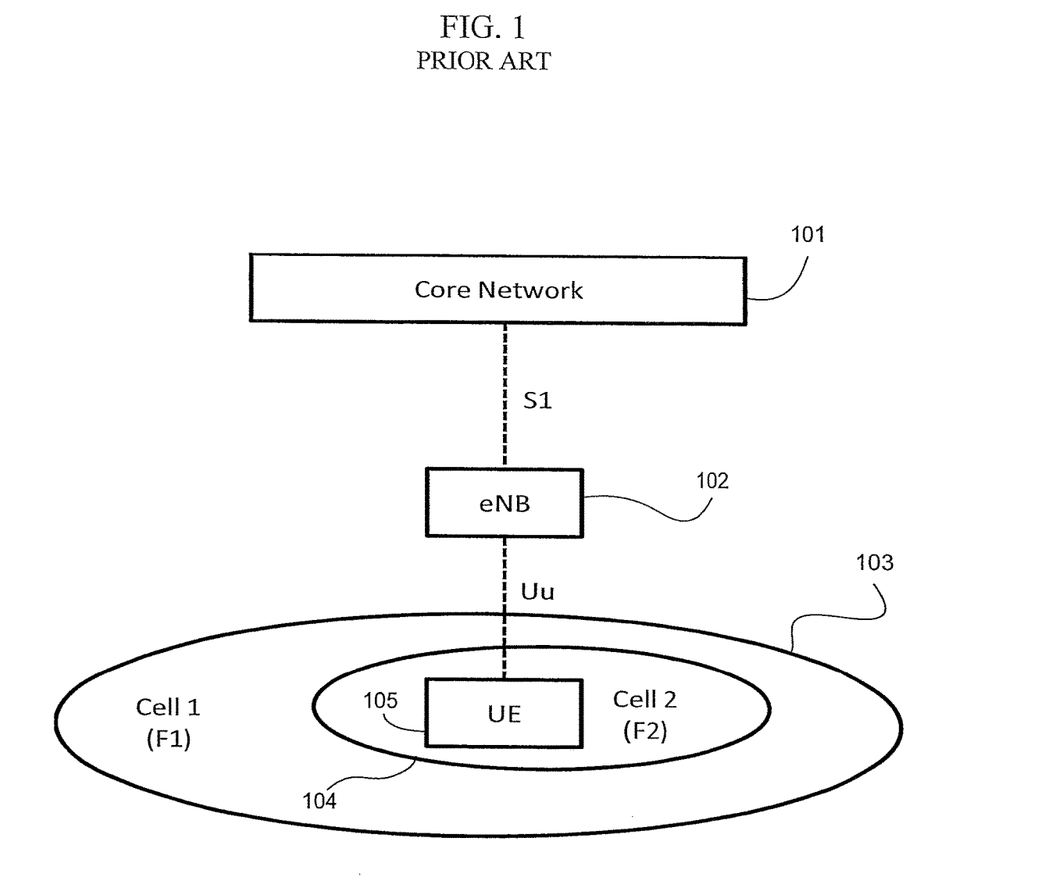
FIG. 1 is an example of an Intra-eNB carrier aggregation scheme.

In LTE-Advanced, carrier aggregation has been introduced to further enhance network capacity and increase peak throughput. Carrier aggregation according to LTE-Advanced requires the carriers to be operated by a single eNB or, in other words, intra-eNB carrier aggregation. For example, FIG. 1 illustrates intra-eNB carrier aggregation in a core network 101, eNB 102, and UE 105. As can be seen, FIG. 1 depicts Cell 1 103 with a carrier frequency of F1 and Cell 2 104, with a carrier frequency of F2. F1 and F2 in this case are different carrier frequencies, but both are operated by the same eNB 102. If a UE 105 is in the coverage of both cells 103, 104 and supports aggregation of the carriers of frequencies F1 and F2, the two carriers can be aggregated and the UE 105 is served by both the two cells 103, 104. As such, because the carrier frequencies F1 and F2 are different, concurrent transmission over the two cells 103, 104 is possible without introducing interference. Carriers aggregated in this way are referred to as component carriers (CC).

According to intra-eNB carrier aggregation, aggregating more than one CC is simply considered as having additional transmission resources. Deciding which carrier to send a transport block (TB) of a data radio bearer (DRB) in the downlink is basically a scheduling decision of an eNB. After a TB is mapped to a CC, the subsequent physical layer processing such as HARQ, coding, rate matching, modulation, and resource mapping for the TB is performed on the CC. As in the downlink, when a UE receives uplink grants in multiple CCs at the same time (i.e., in one subframe), the UE is allowed to freely map a TB of a RB to any of the CCs. After a TB is mapped to a CC, the subsequent physical layer processing for the TB is performed on a per-CC basis.

Intra-eNB CA has no impact on the security framework. As in the case without CA, only one eNB serves a UE. A base key, $K_{eNB}$, can be well-defined for a specific pair of a UE and its serving eNB. Also, as in the case without CA, control plane communication between the UE and the eNB is ciphered by $K_{RRCenc}$, integrity protected by $K_{RRCint}$, and user plane communication between them is ciphered by $K_{UPenc}$, all of which are derived from the base key, $K_{eNB}$.

As LTE and LTE-Advanced continue to grow and expand, a need has arisen to develop inter-eNB carrier aggregation schemes. However, current security schemes are incapable of supporting key generation for inter-eNB carrier aggregation systems.

SUMMARY OF INVENTION

In one or more embodiments, the present invention relates to a system configured to secure radio access with inter-eNB carrier aggregation comprising: a primary eNB (PeNB) configured to secure transmission with a user equipment (UE) by generating a base key and deriving a set of derived keys used to secure transmission on a set of radio bearers that correspond to the set of derived keys; and a secondary eNB (SeNB) configured to secure transmission with the UE using at least one of the set of derived keys received which corresponds to a radio bearer from the set of radio bearers used by the SeNB.

In one or more embodiments, the present invention relates to a secure radio access with inter-eNB carrier aggregation method comprising: selecting a primary eNB (PeNB) for communication with a user equipment (UE); generating a base key and deriving a set of derived keys from the base key at the PeNB each of which corresponds with one from a set of radio bearers; selecting a secondary eNB (SeNB) for communication with the UE; and receiving at least one from the set of derived keys from the PeNB at the SeNB corresponding to the radio bearer the SeNB uses.

In one or more embodiments, the present invention relates to a method for using a primary eNB (PeNB) configured to secure radio access with inter-eNB carrier aggregation, the method comprising: determining a primary cell (PCell) for a user equipment (UE) among cells managed by the PeNB; obtaining a base key (KeNB) of the UE based on a physical cell ID and a downlink frequency of the PCell; deriving a set of derived keys (KRRCenc, KRRCint, and KUPenc) of the UE based on the base key; determining a secondary cell (SCell) for the UE among cells managed by a secondary eNB (SeNB), wherein a downlink frequency of the SCell is different from a downlink frequency of the PCell; determining whether a bearer to be transmitted over the SCell; and sending, through a secure connection between the PeNB and the SeNB, at least one from the set of derived keys to the SeNB depending on whether the bearer is a data bearer or a signaling bearer.

In one or more embodiments, the present invention relates to a method for using a secondary eNB (SeNB) configured to secure radio access with inter-eNB carrier aggregation, the method comprising: determining a SCell for a user equipment (UE) among cells managed by a secondary eNB (SeNB), wherein a downlink frequency of the SCell is different from a downlink frequency of the PCell; determining whether a bearer to be transmitted over the SCell; receiving, through a secure connection between the PeNB and the SeNB, at least one from a set of derived keys to the SeNB depending on whether the bearer is a data bearer or a signaling bearer; and securing the bearer with the at least one from the set of derived keys.

Other aspects and advantages of the invention will be apparent from the following description and the appended claims.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

One or more embodiments of the present disclosure relate generally to a system for secure radio access in a network that employs Inter-eNB carrier aggregation. One or more embodiments of the present invention will be particularly well suited for providing additional transmission resources.

Figure 2:
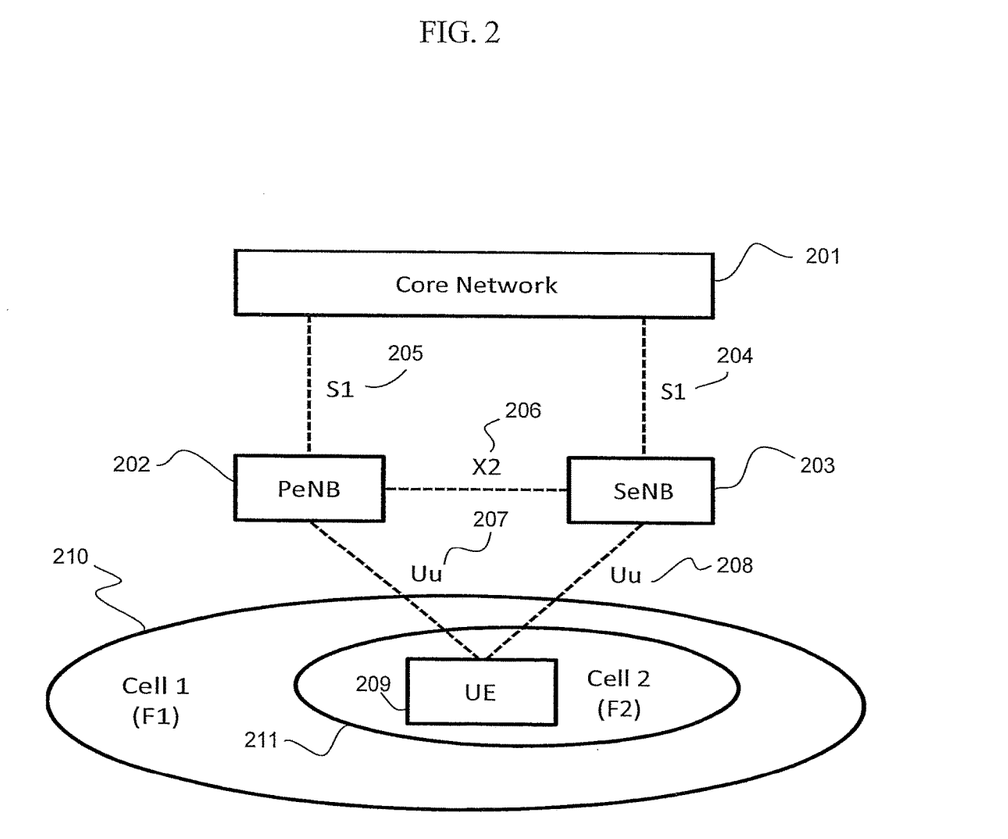
FIG. 2 is an example of an Inter-eNB carrier aggregation scheme according to one or more embodiments of the present disclosure.

FIG. 2 illustrates inter-eNB carrier aggregation according to an embodiment of the present invention. In this example, more than one eNB serves the UE 209. A first cell, Cell 1 210, with a carrier frequency of F1, is operated by one eNB 202. A second cell, Cell 2 211, with a different carrier frequency of F2, is operated by a different eNB 203.

Similar to intra-eNB aggregation, if the UE is in the coverage area of both of the cells, and supports aggregations of the respective carrier frequencies F1 and F2, then the carriers can be aggregated and the UE 209 will be served by the two cells 210, 211. Advantageously, concurrent transmission over both frequencies F1 and F2 is possible without introducing interference because the two frequencies are different. As such, the inter-eNB carrier aggregation of the present embodiment provides additional transmission resources, similar to the intra-eNB carrier aggregation of LTE-Advanced. Unlike intra-eNB carrier aggregation however, inter-eNB carrier aggregation impacts the security of the Uu interface 207, 208 between the UE 209 and the eNBs 202, 203. The existing security framework for intra-eNB carrier aggregation is not directly applicable because it assumes a single serving eNB.

In one or more embodiments of the invention according to FIG. 2, the existing security framework is extended by creating a base key, $K_{eNB}$, for each of the eNB and UE pairs. Two sets of keys, such as $K_{RRCenc}$, $K_{RRCint}$, and $K_{UPenc}$, are then derived from each of the base keys for the respective eNBs. In this embodiment, both the core network and the UE are modified to accommodate multiple base key derivation procedures as well as to be aware of the possibility of more than one serving eNB. As such, the modifications to the core network and the UE allow for all communications between each of the eNBs and the UE to be secured.

In another embodiment of the present invention according to FIG. 2, the existing security framework is extended to create the base key only for a particular eNB-UE pair. In this embodiment, the base key is shared between all of the eNBs which are involved in the inter-eNB carrier aggregation. The base key for a particular eNB-UE pair is then distributed to other serving eNBs through the X2 interface 206. In this embodiment, each eNB receiving the base key then independently derives the same set of derived keys from the base key. All eNBs involved in the carrier aggregation according to the present embodiment may use the base key when deriving a new base key for inter-cell handover, intra-eNB handover, or inter-eNB handover. Additionally, the possibility exists that an eNB may serve only the user plane. In this case, only $K_{UPenc}$ is required and it is not necessary to derive the keys pertaining to the control plane, $K_{RRCenc}$ and $K_{RRCint}$.

In another embodiment of the present invention according to FIG. 2, the objective is to secure radio access between a UE and eNBs without increasing the signaling overhead or the complexity of the core network and UEs. Additionally, another objective of the present embodiment is to limit the exposure of the base key and derived keys to the eNBs to the extent possible.

In the present embodiment, a particular eNB is selected for a UE and designated as the primary eNB (PeNB) 202. A base key is then generated for the PeNB and UE pair. The PeNB then uses the generated base key to derive a set of derived keys for communication with the particular UE. Next, the paths of some of the bearers are switched or setup so that they are then transmitted to and from eNBs other than the PeNB. These alternative eNBs are secondary eNBs (SeNBs) 203. As such, any required derived key is then distributed to the respective SeNB only when the key is necessary to secure the bearers transmitted from the SeNB.

The present embodiment leads to several advantages. First, because a base key for a particular UE is generated only for a single eNB, in this case PeNB 202, the signaling overhead and complexity of the core network and UEs remains the same as in the case without carrier aggregation or as in intra-eNB carrier aggregation as described above. Second, because the base key is kept only in the PeNB unnecessary exposure of the base key is avoided, enhancing security. Third, exposure of derived keys is also limited by combining key distribution with the bearer path management. Finally, all serving eNBs are provided with the necessary keys required to secure the bearers transmitted from the respective eNBs, so in each instance the radio interface to the UE is secured.

Figure 3:
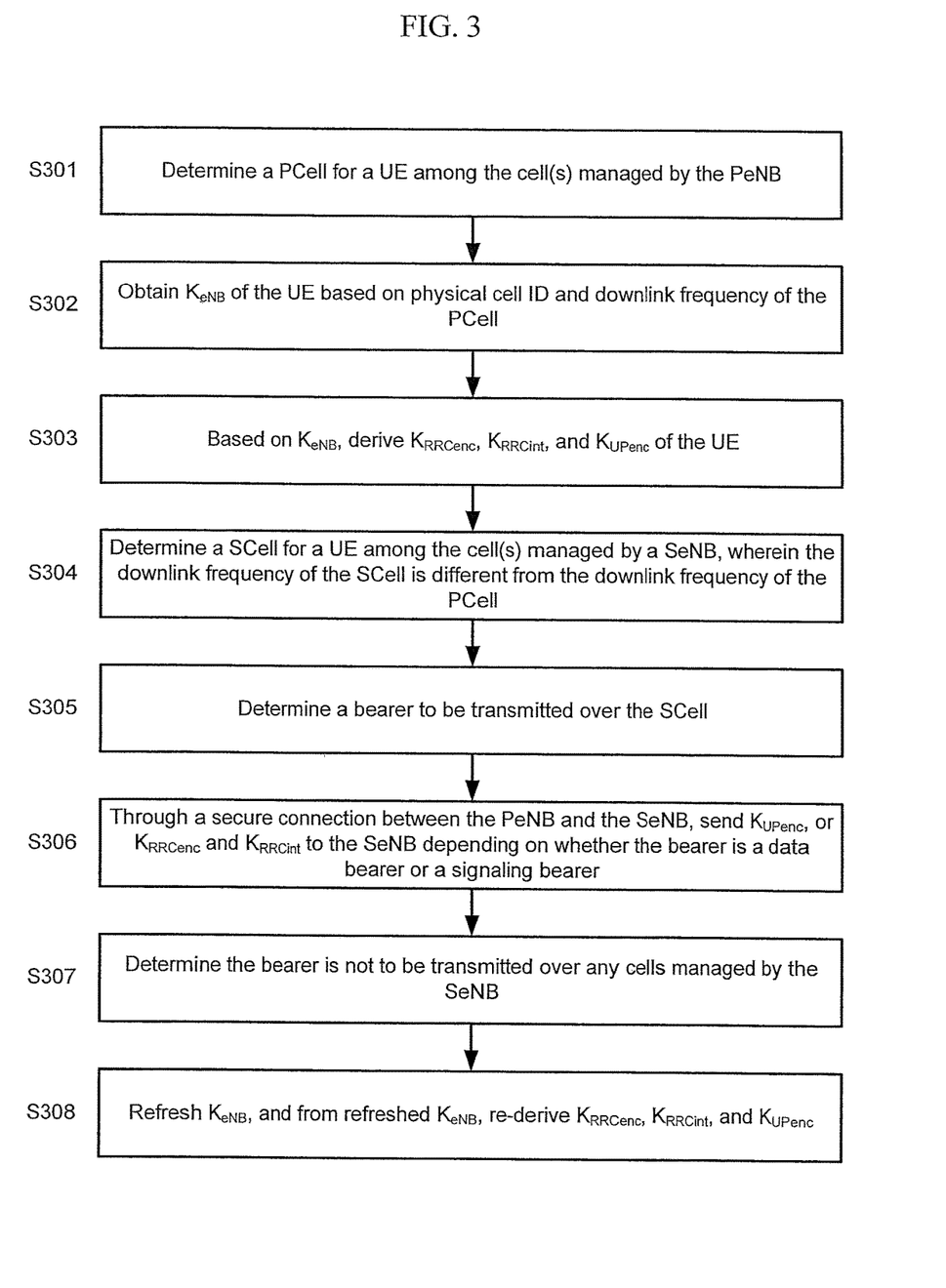
FIG. 3 is an example of a procedure of the PeNB according to one or more embodiments of the present disclosure.

FIG. 3 illustrates an example of a procedure of the PeNB according to one or more embodiments of the present invention. The PeNB has a carrier aggregation (CA) management unit which manages inter-eNB carrier aggregation for a UE that it serves. The CA management unit performs several steps to properly initiate the carrier aggregation scheme for a UE.

Initially, in step S301, the CA management unit of the PeNB determines a primary cell (PCell) for the UE among the cells managed by the PeNB. Considerations for determining the PCell may include, but are not limited to: measurement results, such as Reference Signal Received Power (RSRP) and Reference Signal Received Quality (RSRQ) provided by the UE through the wireless communication unit as instructed by the Radio Resource Control (RRC) unit, or any other channel quality indicators measured by the wireless communication unit of the PeNB. Additionally, the CA management unit may also consider current, past, and expected loads of each of the cells managed by itself or by other eNBs. Load information from the other eNBs is communicated through the X2 interface through the backhaul communication unit and the X2 Application Protocol (X2AP) Unit.

Alternative considerations by the PeNB include the coverage of each cell, which is determined by the carrier frequency, the transmission power, and the inter-site distance, as well as other factors that would be appreciated by those skilled in the art. Preferably, the PCell has a channel quality high enough to provide a desired level of Quality of Service (QoS), the load is light enough to help load balancing of the network, and the coverage is sufficiently large in view of the UE speed so that the number of handovers is limited or fully suppressed. It is desirable to suppress the number of handovers given the required generation of core network signaling induced by handovers.

In certain circumstances with the inter-eNB handover of a UE, the PCell selection may be performed by an eNB other than the current PeNB. In some circumstances, for example, the source, or previous, eNB or PeNB may perform the handover which is communicated in a HANDOVER REQUEST message to the PeNB through the X2 interface by the backhaul communication unit and the X2AP. In this case, the CA management unit of the current PeNB simply adopts the PCell as selected by the source eNB. Additionally, if necessary, the current PeNB may later change the PCell by performing an intra-eNB handover.

Next, in Step S302, the $K_{eNB}$ management unit of the PeNB obtains the base key, $K_{eNB}$, which has been derived based on the physical cell ID and the downlink frequency of the PCell. For example, in one or more embodiments, $K_{eNB}$ may be generated according to the following formula:

$K_{eNB}$=HMAC-SHA(Key,S)

In the preceding formula, Key is a 256-bit Next Hop (NH) parameter or the current $K_{eNB}$. S is derived based on the following formula:

$S=FC\|P0\|L0\|P1\|L1$

The variables used to derive S are as follows:
FC=0x13
P0=the target physical cell ID or PCI
L0=the length of the PCI (i.e., 0x00, 0x02, etc.)
P1=the target physical cell downlink frequency or EARFCN-DL
L1=the length of EARFCN-DL (i.e., 0x00, 0x02)

In the preceding formula for deriving S, the "∥" symbol is used to indicate a concatenation. Additionally, HMAC-SHA is a function as specified in IETF RFC 2104 (1997): "HMAC: Keyed-Hashing for Message Authentication" and ISO/IEC 10118-3:2004: "Information Technology-Security Techniques-Hash-Functions—Part 3: Dedicated Hash-Functions." The $K_{eNB}$ derived according to the above is then stored in the memory unit.

In one or more embodiments of inter-eNB handover of the UE, the $K_{eNB}$ derivation may be performed by an eNB other than the current PeNB. For example, in some embodiments the $K_{eNB}$ derivation may be performed by the source or previous eNB or PeNB and is then communicated through a HANDOVER REQUEST message to the current PeNB by the X2 interface using the backhaul communication unit and the X2AP. In this case, the $K_{eNB}$ management unit of the current PeNB adopts the $K_{eNB}$ as derived by the source eNB.

Upon completion of the handover, the current PeNB sends a S1 PATH SWITCH REQUEST message to the MME via the S1 Application Protocol (S1AP) unit and the backhaul communication unit. Upon the reception of the S1 PATH SWITCH REQUEST, the MME sends the newly computed NH to the PeNB in the S1 PATH SWITCH ACKNOWLEDGE message. The PeNB then stores the NH in the memory unit and removes any other existing unused NH stored in memory, if any exist. If necessary, the PeNB may later change the $K_{eNB}$ by performing an intra-cell handover. In one example, the PeNB can immediately initiate an intra-cell handover to take the new NH into use, once the new NH has arrived in the S1 PATH SWITCH REQUEST ACKNOWLEDGE message.

In Step S303, the $K_{eNB}$ management unit of the PeNB derives $K_{RRCenc}$, $K_{RRCint}$, and $K_{UPenc}$ of the UE based upon the $K_{eNB}$. For example, the keys may be derived according to the following formula:

Derived Key=HMAC-SHA(Key,S)

In the preceding formula, Key is the 256-bit $K_{eNB}$. S is derived based on the following formula:

$S=FC\|P0\|L0\|P1\|L1$

The variables used to derive S are as follows:
FC=0x15
P0=algorithm type distinguisher
L0=the length of the PCI algorithm type distinguisher (i.e. 0x00, 0x01)
P1=algorithm identity
L1=the length of algorithm identity (i.e. 0x00, 0x01)

The algorithm type distinguisher is specified according the following table:

| Algorithm distinguisher | Value |
| --- | --- |
| RRC-enc-alg (for $K_{RRCenc}$) | 0x03 |
| RRC-int-alg (for $K_{RRCint}$) | 0x04 |
| UP-enc-alg (for $K_{UPenc}$) | 0x05 |

The algorithm identity is a 4-bit identifier with "0000" for Null, ciphering or integrity protection, algorithm and "0001" for the SNOW 3G based algorithm identical to UEA2 as specified in 3GPP TS 35.215: "Confidentiality and Integrity Algorithms UEA2 & UIA2; Document 1: UEA2 and UIA2 specifications"), and "0010" for AES based algorithm (which is based on AES of NIST: "Advanced Encryption Standard (AES) (FIPS PUB 197)" in CTR mode of NIST Special Publication 800-38A (2001): "Recommendation for Block Cipher Modes of Operation"). Once derived, the keys are stored in the memory unit. Advantageously, because of the HMAC-SHA, it is computationally infeasible to predict $K_{eNB}$ from $K_{RRCenc}$, $K_{RRCint}$, or $K_{UPenc}$.

In step S304, the CA management unit of the PeNB and SeNB determine a SCell for the UE among the cell or cells managed by the SeNB. The downlink frequency of the SCell is different from the downlink frequency of the PCell. Considerations for determining the SCell may include, but are not limited to: measurement results, such as RSRP and RSRQ provided by the UE through the wireless communication unit of the PeNB as instructed by the RRC unit of the PeNB, or any other channel quality indicators measured by the wireless communication unit of the SeNB, as well as other factors that would be appreciated by those skilled in the art. Additionally, the CA management unit of the PeNB and the SeNB may also consider current, past, and expected loads of each of the cells managed by the SeNB or other eNB s.

The final decision on SCell selection may be made by the CA management unit of either the PeNB or the SeNB. The role of the CA management unit of the non-selecting eNB is limited to optionally providing the measurement results, the load information, and the coverage information to the eNB in charge of the SCell selection, and to adopting the SCell as selected by the eNB. The selected SCell is then communicated between the PeNB and the SeNB through the backhaul communication unit and the X2AP unit of each eNB.

In step S305, the bearer path management unit of the PeNB and the SeNB determine a bearer to be transmitted over the SCell. Considerations for determining the bearer include, but are not limited to: the QoS requirement and the traffic characteristics of the bearer, and the load and the coverage of the PCell and SCell.

Similar to SCell selection, in one or more embodiments the bearer path management unit of either the PeNB or the SeNB may select the bearer. In this case, the role of the bearer path management unit of the other eNB is limited to optionally providing the information on the QoS requirement and the traffic characteristics of the bearer. Additionally, the bearer path management unit of the other eNB may also provide the load and the coverage as a result of adopting the bearer as selected by the eNB in charge of the bearer selection.

The bearer is either a data bearer or a signaling bearer. If the bearer is a data bearer, it may be further classified into a real-time data bearer and a non-real-time data bearer.

Those skilled in the art will appreciate that there are many ways of optimizing the paths of the bearers. In one or more embodiments, it is advantageous to serve signaling bearers with a cell with large coverage to make control signaling reliable. In one or more other embodiments, such as in the case of a video download, it is advantageous to serve a data bearer with a cell providing high throughput. In one or more other embodiments, such as in the case of a voice communication, it is advantageous to serve a data bearer with a cell having both large coverage and guaranteed QoS. Those skilled in the art will appreciate that the present invention is broadly applicable regardless of the specific path optimization.

The bearer determined in step S305 is exchanged between the PeNB and the SeNB through the backhaul communication unit and the X2AP unit of each eNB. The PeNB and the SeNB may store, in the memory unit, the type, control plane, or user plane, that is to be transmitted by the SeNB.

In step S306, the derived key distribution unit of the PeNB sends $K_{UPenc}$, or $K_{RRCenc}$ and $K_{RRCint}$ to the SeNB depending on whether the bearer is a data bearer or a signaling bearer. In the case that the bearer is a data bearer, $K_{UPenc}$ is sent. In another case when the bearer is a signal bearer, $K_{RRCenc}$ and $K_{RRCint}$ are sent. The derived keys sent by the derived key distribution unit of the PeNB are received by the derived keys distribution unit of the SeNB through the X2 interface using the X2AP unit and the backhaul communication unit of each eNB.

In one or more embodiments, the communication channel between the PeNB and the SeNB is secured using a physically secured connection. In one or more other embodiments, the communication channel between the PeNB and the SeNB is secured using the network domain security (NDS) as specified in 3GPP TS 33.210: "3rd Generation Partnership Project; Technical Specification Group Services and System Aspects; Network Domain Security; IP network layer security." In all embodiments, the SeNB receives the key or keys required to secure the communication of the bearer.

The distribution of the derived keys is coupled with the bearer path management. Those skilled in the art will appreciate that sending the derived key to the SeNB only when it is necessary in the terms of the bearer that is served by the SeNB, unnecessary exposure of the derived keys is prevented. Additionally, because only the derived key is sent to the SeNB, it is computationally infeasible to predict the base key, $K_{eNB}$, from $K_{RRCenc}$, $K_{RRCint}$, or $K_{uPenc}$. Therefore, unnecessary exposure of the base key is also avoided.

In one or more embodiments, step S306 may be omitted if the derived key or derived keys for the bearer have already been sent to the SeNB. In one example, if the PeNB finds in the memory unit that the type of other bearers to be transmitted by the SeNB is the user plane, then there is no need to send $K_{UPenc}$ again, because it has already been sent to the SeNB for other bearers.

In step S307, the bearer path management unit of the PeNB and SeNB determine whether a bearer is not to be transmitted over any cells managed by the SeNB. In this instance, the bearer is now to be transmitted by the PeNB or another SeNB. Then, the PeNB or the SeNB checks the memory unit to determine whether there is another bearer of the same type that is to be transmitted over the SeNB. If not, then the SeNB no longer needs the derived keys for the type of the bearers.

In step S308, the $K_{eNB}$ management unit of the PeNB refreshes the base key by performing, for example, intra-cell handover. In this case, the new $K_{eNB}$ is derived from HMAC-SHA (Key, S) using the same S as used in the derivation of the current $K_{eNB}$ and using either the current $K_{eNB}$ or NH as Key. New derived keys can then be obtained from the new $K_{eNB}$. Advantageously, in this instance, it is computationally infeasible to predict the new base key $K_{eNB}$ from the current derived key, so it is also computationally infeasible to predict the new derived key.

In one or more embodiments, refreshing the base key, and re-deriving and re-distributing the derived keys consume processing power of PeNB and incur network overhead. One possible compromise is to perform step S308 only when the SeNB has no bearers of a certain type at all. For example, in step S307, the bearer path management unit of the PeNB and SeNB determine whether a bearer is not to be transmitted over any cells managed by the SeNB. More specifically, the bearer is now to be transmitted by the PeNB or another SeNB. The PeNB or the SeNB then checks the memory unit to determine whether there is another bearer of the same type that is to be transmitted over the SeNB. If there is no bearer to be transmitted over the SeNB, the SeNB does not need the derived keys for the type of the bearers.

According to one or more embodiments of the present invention, the meaning of the word "generating" may include both "creating" and "receiving from the source eNB (e.g. eNB_1) and "adopting" a base key.

Figure 4:
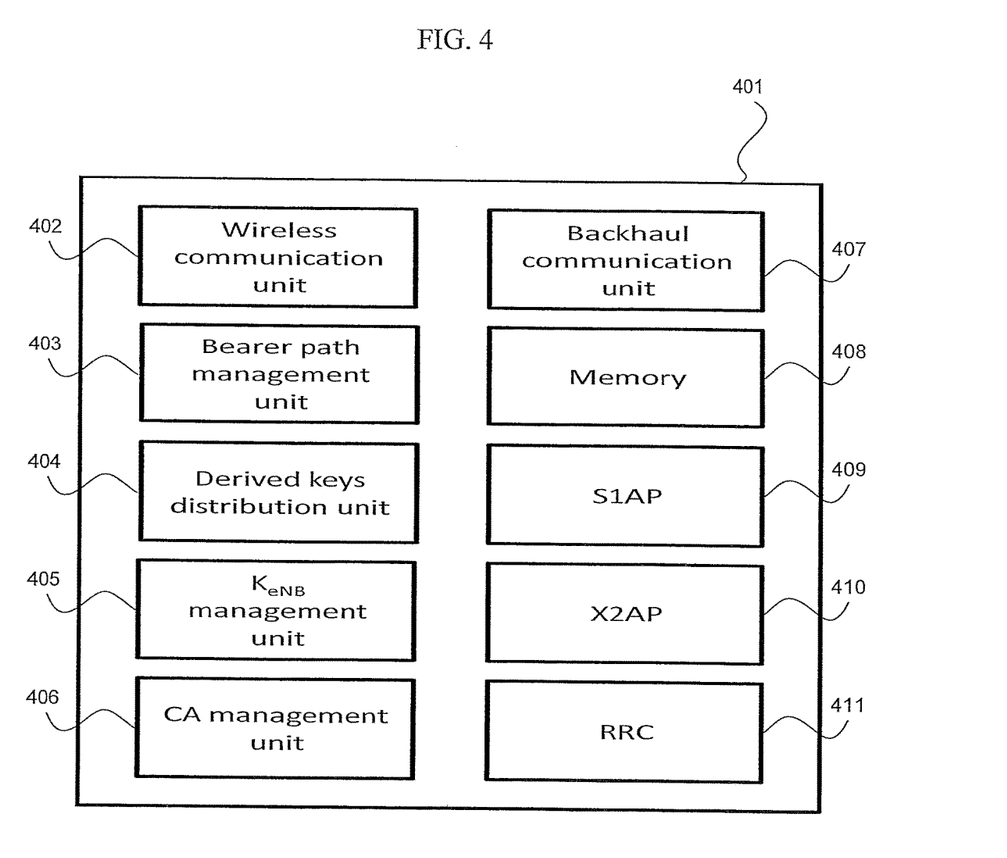
FIG. 4 is an example of a block diagram of the PeNB according to one or more embodiments of the present disclosure.

FIG. 4 is an example of a block diagram of the PeNB according to one or more embodiments of the present disclosure. In the present embodiment, the PeNB 401 comprises a wireless communication unit 402, a bearer path management unit 403, a derived keys distribution unit 404, a $K_{eNB}$ management unit 405, a CA management unit 406, a backhaul communication unit 407, a memory unit 408, a S1AP unit 409, a X2AP unit 410, and a RRC unit 411.

The wireless communication unit 402 performs communications through a wireless network. For example, the wireless communication unit may communicate with one or more UEs. In one or more embodiments, the wireless communication unit 402 may be triggered by the RRC unit 411, to collect measurements such as RSRP or RSRQ which are provided by the UE. Those skilled in the art will appreciate that the wireless communication unit 402 may collect other channel quality indicators measured by the UE, the PeNB, or the SeNB.

The bearer path management unit 403 determines the bearer to be transmitted over within the respective cells. The bearer path management unit 403 considers several variables in selecting a suitable bearer which include, but are not limited to, QoS requirements, and traffic characteristics of the bearer. Additionally, the bearer path management unit may consider load and coverage of a respective cell. The bearer path management unit 403 may also determine that certain bearers are not to be transmitted over particular cells if the criteria are not met.

The derived keys distribution unit 404 performs the distribution of the derived keys. The derived keys distribution unit 404 determines whether a bearer is a data bearer or a signaling bearer. In the case that a bearer is a data bearer, the derived keys distribution unit 404 sends only the $K_{UPenc}$ key. In the case that a bearer is a signaling bearer, the derived keys distribution unit sends the $K_{RRCenc}$ and $K_{RRCint}$ keys. In one or more embodiments, the derived keys distribution unit will send the keys from the eNB to another eNB through the X2 interface by using the X2AP unit 410. In one or more embodiments, the distribution of the derived keys is also tied to the bearer path selection performed by the bearer path management unit 403.

The $K_{eNB}$ management unit 405 of the PeNB derives the base key, $K_{eNB}$, based on the physical cell ID and the downlink frequency in the PCell. In one or more embodiments, and as further described in step S302 of FIG. 3, the $K_{eNB}$ management unit 405 derives $K_{eNB}$ based on the formula:

$$K_{eNB}=HMAC\text{-}SHA(Key, S)$$

In one or more other embodiments, the KeNB management unit 405 may simply adopt the $K_{eNB}$ of another eNB, such as in the case of an inter-eNB handover. In this case, the $K_{eNB}$ management unit 405 of the new PeNB adopts, via the X2 interface through the backhaul communication unit 407, the $K_{eNB}$ derived by the previous PeNB.

The CA management unit 406 selects the cell for an eNB. The CA management unit 406 considers several factors in selecting a cell including, but not limited to: RSRP and RSRQ. Those skilled in the art will appreciate that the CA management unit 406 may also consider other types of channel quality indicators.

Typically, the CA management unit 406 of the PeNB determines the PCell for the UE among the cells managed by the PeNB. In one or more embodiments, the CA management unit 406 of a plurality of eNBs may also cooperate to select a cell. In one embodiment, the CA management unit 406 of both the PeNB and the SeNB are capable of selecting the SCell. In this case, the final cell selection may be made by the CA management unit 406 of either the PeNB or the SeNB. The role of the CA management unit 406 not performing the selection in this case is limited to provided the measurement results, such as load or other coverage information, to the eNB in charge of SCell selection.

The backhaul communication unit 407 communicates with other eNBs and base stations. In one or more embodiments, the backhaul communication unit 407 may, for example, communicate through a wired interface. The backhaul communication unit 407, may, for example, be used to communicate cell selections, bearers, or keys.

The memory unit 408 stores information important to the eNB. Information that may be stored in the memory unit 408 includes, but is not limited to: the base key, $K_{eNB}$, derived keys, $K_{RRCinc}$, $K_{RRCenc}$, $K_{UPenc}$, or bearers. Those skilled in the art will appreciate that the memory unit 408 may also be used to store other values that may be important to the operation of the eNB.

The S1AP unit 409 communicates, using the S1 Protocol, with the core network. In one or more embodiments, the S1AP unit 409 of the PeNB communicates to the MME of the core network. Additionally, in one or more embodiments, the S1AP unit 409 works together in combination with the backhaul communication unit 407.

The X2AP unit 410 facilities communication between the eNBs using the X2 interface. In one or more embodiments, the X2AP unit may be used to communicate data between eNBs which may include, but is not limited to: load information, QoS information, coverage information, base keys, derived keys, or bearers. Those skilled in the art will appreciate that other information such as channel quality indicators or other data important to the function of the eNB may be communicated using the X2AP unit 410.

The RRC unit 411 communicates using the protocol for control signaling. Thus, in one or more embodiments the RRC unit 411 is responsible for sending, receiving, and interpreting control signals. The RRC unit 411 may be used by an eNB to instruct another eNB to perform a function, such as, for example, collect measurement results RSRP, RSRQ, or other channel quality indicators.

Figure 5:
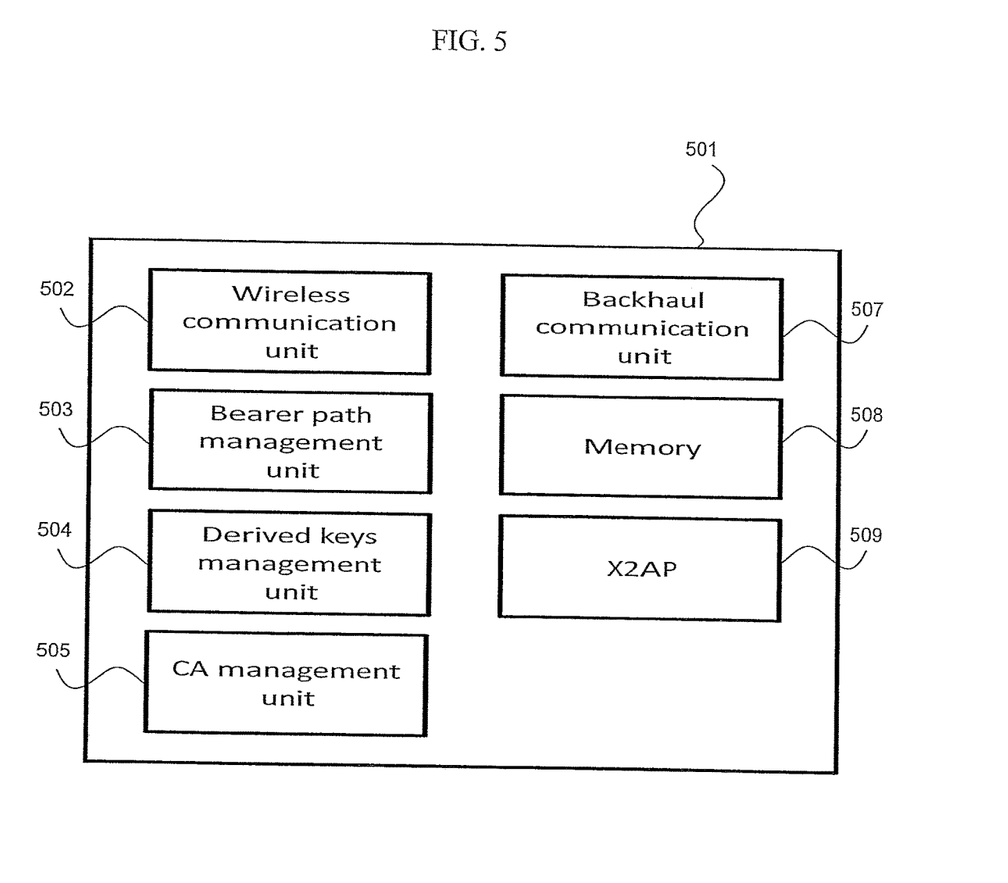
FIG. 5 is an example of a block diagram of the SeNB according to one or more embodiments of the present disclosure.

FIG. 5 is an example of a block diagram of the SeNB according to one or more embodiments of the present disclosure. In the present embodiment, the SeNB 501 comprises a wireless communication unit 502, a bearer path management unit 503, a derived keys management unit 504, a CA management unit 505, a backhaul communication unit 507, a memory unit 508, and a X2AP unit 509.

The wireless communication unit 502 performs communications through a wireless network. For example, the wireless communication unit may communicate with one or more UEs. In one or more embodiments, the wireless communication unit 502 may collect measurements such as RSRP or RSRQ which are provided by the UE. Those skilled in the art will appreciate that the wireless communication unit 502 may collect other channel quality indicators measured by the UE, the PeNB, or the SeNB.

The bearer path management unit 503 determines the bearer to be transmitted over within the respective cells. The bearer path management unit 503 considers several variables in selecting a suitable bearer which include, but are not limited to, QoS requirements, and traffic characteristics of the bearer. Additionally, the bearer path management unit may consider load and coverage of a respective cell. The bearer path management unit 503 may also determine that certain bearers are not to be transmitted over particular cells if the criteria are not met.

The derived keys management unit 504 manages the derived keys provided by the PeNB. The derived keys management unit 504 determines whether a bearer is a data bearer or a signaling bearer. In the case that a bearer is a data bearer, the derived keys distribution management unit 504 uses the $K_{UPenc}$ key. In the case that a bearer is a signaling bearer, the derived keys management unit uses the $K_{RRCenc}$ and $K_{RRCint}$ keys. In one or more embodiments, the derived keys management unit will receive the keys from the PeNB through the X2 interface by using the X2AP unit 509. In one or more embodiments, the distribution of the derived keys is also tied to the bearer path selection performed by the bearer path management unit 503.

The CA management unit 505 selects the cell for an eNB. The CA management unit 505 considers several factors in selecting a cell including, but not limited to: RSRP and RSRQ. Those skilled in the art will appreciate that the CA management unit 505 may also consider other types of channel quality indicators.

Typically, the CA management unit 505 of the SeNB determines the SCell for the UE among the cells managed by the SeNB. In one or more embodiments, the CA management unit 505 of a plurality of eNBs may also cooperate to select a cell. In one embodiment, the CA management unit 505 of both the PeNB and the SeNB are capable of selecting the SCell. In this case, the final cell selection may be made by the CA management unit 505 of either the PeNB or the SeNB. The role of the CA management unit 505 not performing the selection in this case is limited to provided the measurement results, such as load or other coverage information, to the eNB in charge of SCell selection.

The backhaul communication unit 507 communicates with other eNBs and base stations. In one or more embodiments, the backhaul communication unit 507 may, for example, communicate through a wired interface. The backhaul communication unit 507, may, for example, be used to communicate cell selections, bearers, or keys.

The memory unit 508 stores information important to the eNB. Information that may be stored in the memory unit 508 includes, but is not limited to: the derived keys, $K_{RRCinc}$, $K_{RRCenc}$, $K_{UPenc}$, or bearers. Those skilled in the art will appreciate that the memory unit 508 may also be used to store other values that may be important to the operation of the eNB.

The X2AP unit 509 facilities communication between the eNBs using the X2 interface. In one or more embodiments, the X2AP unit may be used to communicate data between eNBs which may include, but is not limited to: load information, QoS information, coverage information, derived keys, or bearers. Those skilled in the art will appreciate that other information such as channel quality indicators or other data important to the function of the eNB may be communicated using the X2AP unit 509.

Figure 6:
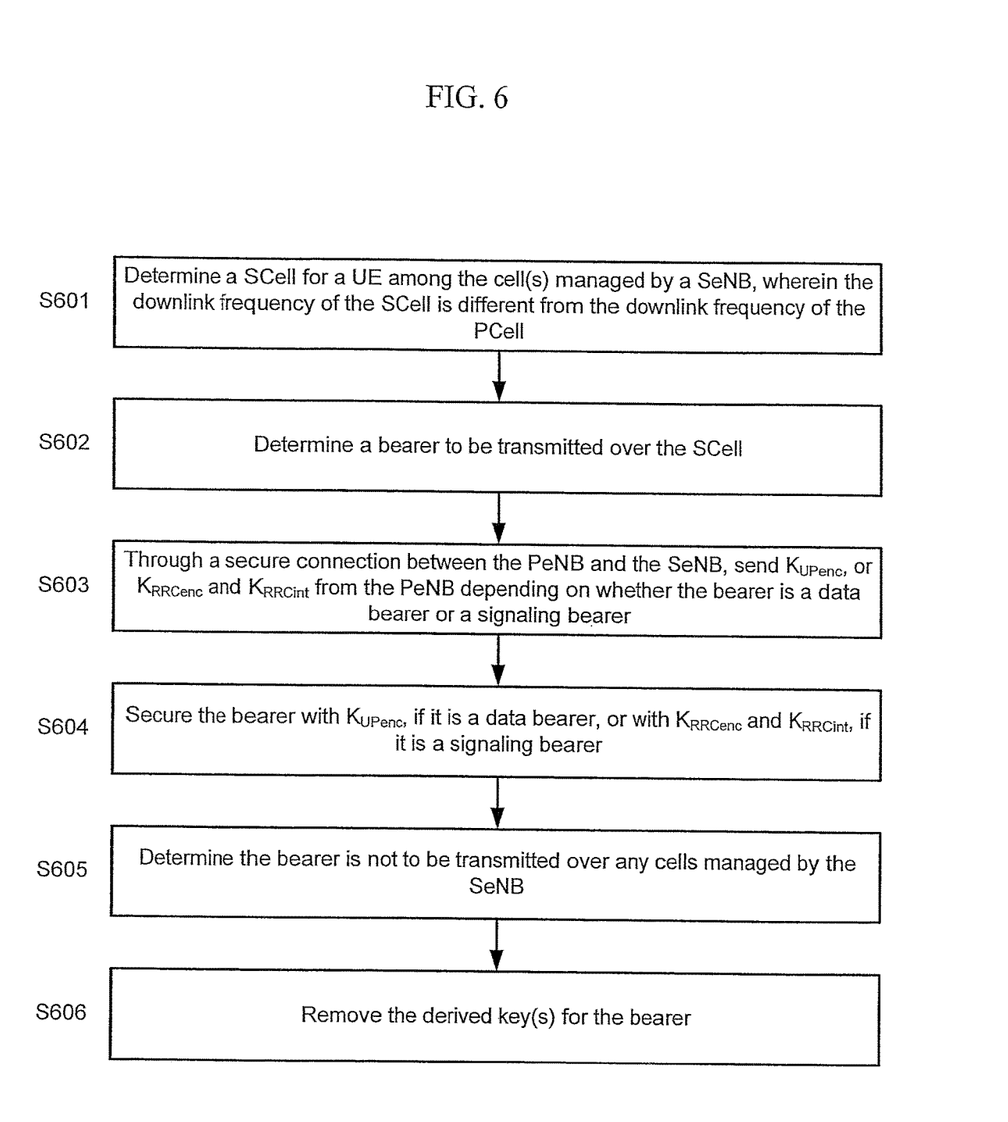
FIG. 6 is an example of a procedure of the SeNB according to one or more embodiments of the present disclosure.

FIG. 6 illustrates an example of a procedure of the SeNB according to one or more embodiments of the present invention. The SeNB has a carrier aggregation (CA) management unit which manages inter-eNB carrier aggregation for a UE that it serves. The CA management unit performs several steps to properly initiate the carrier aggregation scheme for a UE.

In step S601, the CA management unit of the PeNB and SeNB determine a SCell for the UE among the cell or cells managed by the SeNB. The downlink frequency of the SCell is different from the downlink frequency of the PCell. Considerations for determining the SCell may include, but are not limited to: measurement results, such as RSRP and RSRQ provided by the UE through the wireless communication unit of the PeNB as instructed by the RRC unit of the PeNB or any other channel quality indicators measured by the wireless communication unit of the SeNB, as well as other factors that would be appreciated by those skilled in the art. Additionally, the CA management unit of the PeNB and the SeNB may also consider current, past, and expected loads of each of the cells managed by the SeNB or other eNBs.

The final decision on SCell selection may be made by the CA management unit of either the PeNB or the SeNB. The role of the CA management unit of the non-selecting eNB is limited to optionally providing the measurement results, the load information, and the coverage information to the eNB in charge of the SCell selection and to adopting the SCell as selected by the eNB. The selected SCell is then communicated between the PeNB and the SeNB through the backhaul communication unit and the X2AP unit of each eNB.

In step S602, the bearer path management unit of the PeNB and the SeNB determine a bearer to be transmitted over the SCell. Considerations for determining the bearer include, but are not limited to: the QoS requirement and the traffic characteristics of the bearer, and the load and the coverage of the PCell and SCell.

Similar to SCell selection, in one or more embodiments, the bearer path management unit of either the PeNB or the SeNB may select the bearer. In this case, the role of the bearer path management unit of the other eNB is limited to optionally providing the information on the QoS requirement and the traffic characteristics of the bearer. Additionally, the bearer path management unit of the other eNB may also provide the load and the coverage as a result of adopting the bearer as selected by the eNB in charge of the bearer selection.

The bearer is either a data bearer or a signaling bearer. If the bearer is a data bearer, it may be further classified into a real-time data bearer and a non-real-time data bearer.

Those skilled in the art will appreciate that there are many ways of optimizing the paths of the bearers. In one or more embodiments, it is advantageous to serve signaling bearers with a cell with large coverage to make control signaling reliable. In one or more other embodiments, such as in the case of a video download, it is advantageous to serve a data bearer with a cell providing high throughput. In one or more other embodiments, such as in the case of a voice communication, it is advantageous to serve a data bearer with a cell having both large coverage and guaranteed QoS. Those skilled in the art will appreciate that the present invention is broadly applicable regardless of the specific path optimization.

The bearer determined in step S602 is exchanged between the PeNB and the SeNB through the backhaul communication unit and the X2AP unit of each eNB. The PeNB and the SeNB may store, in the memory unit, the type, control plane, or user plane, that is to be transmitted by the SeNB.

In step S603, the derived key management unit receives the derived keys from the PeNB through the X2 interface using the X2AP unit and the backhaul communication unit. The derived key distribution unit of the PeNB sends $K_{UPenc}$, or $K_{RRCenc}$ and $K_{RRCint}$ to the SeNB depending on whether the bearer is a data bearer or a signaling bearer. In the case that the bearer is a data bearer, $K_{UPenc}$ is received by the derived key management unit of the SeNB. In another case when the bearer is a signal bearer, $K_{RRCenc}$ and $K_{RRCint}$ are received by the derived key management unit of the SeNB. Any derived keys received during step S603 are subsequently stored in the memory unit of the SeNB.

In one or more embodiments, the communication channel between the PeNB and the SeNB is secured using a physically secured connection. In one or more other embodiments, the communication channel between the PeNB and the SeNB is secured using the network domain security (NDS) as specified in 3GPP TS 33.210: "3rd Generation Partnership Project; Technical Specification Group Services and System Aspects; Network Domain Security; IP network layer security." In all embodiments, the SeNB receives the key or keys required to secure the communication of the bearer.

The distribution of the derived keys is coupled with the bearer path management. Those skilled in the art will appreciate that sending the derived key to the SeNB only when it is necessary in the terms of the bearer that is served by the SeNB, unnecessary exposure of the derived keys is prevented. Additionally, because only the derived key is sent to the SeNB, it is computationally infeasible to predict the base key, $K_{eNB}$, from $K_{RRCenc}$, $K_{RRCint}$, or $K_{UPenc}$. Therefore, unnecessary exposure of the base key is also avoided.

In one or more embodiments, step S603 may be omitted if the derived key or derived keys for the bearer have already been sent to the SeNB. In one example, if the PeNB finds in the memory unit that the type of other bearers to be transmitted by the SeNB is the user plane, then there is no need to send $K_{UPenc}$ again, because it has already been sent to the SeNB for other bearers.

In step S604, the bearer is communicated to the UE from the SeNB. The bearer is communicated between the SeNB and the UE securely using the derived key or derived keys.

In step S605, the bearer path management unit of the PeNB and SeNB determine whether a bearer is not to be transmitted over any cells managed by the SeNB. In this instance, the bearer is now to be transmitted by the PeNB or another SeNB. Then, the PeNB or the SeNB checks the memory unit to determine whether there is another bearer of the same type that is to be transmitted over the SeNB. If not, then the SeNB no longer needs the derived keys for the type of the bearers.

In step S606, a refreshing of the base key, $K_{eNB}$, by the $K_{eNB}$ management unit of the PeNB is determined to have been performed. The PeNB may refresh the base key, for example, in the case of an intra-cell handover. In step S606, if the SeNB determines that the PeNB has refreshed its base key, then the respective derived keys are removed from the memory unit of the SeNB.

ABBREVIATIONS

CA Carrier Aggregation
CC Component Carriers
CN Core Network
DRB Data Radio Bearers
eNB eNodeB
HARQ Hybrid Automatic Repeat Request
LTE Long Term Evolution
MME Mobile Management Entity
NDS Network Domain Security
PCell Primary Cell
PeNB Primary eNB
QoS Quality of Service
RB Resource Block
RRC Radio Resource Control
RSRP Reference Signal Received Power
RSRQ Reference Signal Received Quality
SCell Secondary Cell
SeNB Secondary eNB
SLAP S1 Application Protocol
TB Transport Block
UE User equipment
X2AP X2 Application Protocol The present invention is described above by referring to specific embodiments. However, a person skilled in the art may understand that the above embodiments are described for illustrative purpose only and may think of examples of various modifications, transformations, alterations, changes, and the like. To promote an understanding of the present invention, specific values are used as examples throughout the description. However, it should be noted that such specific values are just sample values unless otherwise described, and any other values may be used.

For illustrative purposes, the apparatus according to an embodiment of the present invention is described with reference to the functional block diagram. However, such an apparatus may be provided by hardware, software, or a combination thereof. Further, in one or more embodiments, the present invention may be a computer program stored on any suitable non-transitory, computer-readable media. The present invention is not limited to the embodiments described above, and various modifications, transformations, alterations, exchanges, and the like may be made without departing from the scope and spirit from the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a primary eNB (PeNB) comprising hardware that:
      generates a base key to secure transmission on a first radio bearer with a user equipment (UE); and
      derives a set of derived keys used to secure transmission on a second radio bearer from a set of radio bearers that correspond to the set of derived keys;
   a secondary eNB (SeNB) comprising hardware configured to secure transmission on the second radio bearer with the UE using at least one of the set of derived keys received from the PeNB, which corresponds to the second radio bearer from the set of radio bearers used by the SeNB; and
   a plurality of eNBs managed by the PeNB,
   wherein the UE communicates with the PeNB and the SeNB simultaneously by performing inter-eNB carrier aggregation with the PeNB and the SeNB using the first radio bearer and the second radio bearer, and
   wherein each of the plurality of eNBs is configured to secure transmission with the UE using at least one of the set of derived keys received which corresponds to a radio bearer from the set of radio bearers used by the respective eNB.

2. The system configured to secure radio access with inter-eNB carrier aggregation of claim 1, further comprising:

a secure interface between the PeNB and the SeNB over which derived keys are shared from the PeNB to the SeNB.

3. A method comprising:

selecting a primary eNB (PeNB) for communication over a first radio bearer with a user equipment (UE);

generating a base key and deriving a set of derived keys from the base key at the PeNB each of which corresponds with one from a set of radio bearers;

selecting a secondary eNB (SeNB) for communication over a second radio bearer of the set of radio bearers with the UE;

receiving at least one from the set of derived keys from the PeNB at the SeNB corresponding to the second radio bearer the SeNB uses;

communicating, by the UE, with the PeNB and the SeNB simultaneously by performing inter-eNB carrier aggregation with the PeNB and the SeNB using the first radio bearer and the second radio bearers;

determining whether the second radio bearer is not to be transmitted over any cells managed by the SeNB; and refreshing the base key and re-deriving the set of derived keys based on the refreshed base key.

* * * * *